(12) United States Patent
Han

(10) Patent No.: US 9,586,479 B2
(45) Date of Patent: Mar. 7, 2017

(54) INTERLOCKING SYSTEM BETWEEN CONTENT PLAYER DEVICES

(71) Applicant: HYUNDAI MOBIS CO., LTD., Seoul (KR)

(72) Inventor: Il Seok Han, Yongin (KR)

(73) Assignee: HYUNDAI MOBIS CO., LTD, Seoul (KR)

( * ) Notice: Subject to any disclaimer, the term of this patent is extended or adjusted under 35 U.S.C. 154(b) by 0 days.

(21) Appl. No.: 14/871,912

(22) Filed: Sep. 30, 2015

(65) Prior Publication Data

US 2016/0157286 A1 Jun. 2, 2016

(30) Foreign Application Priority Data

Nov. 27, 2014 (KR) ........................ 10-2014-0167351

(51) Int. Cl.
*H04M 1/00* (2006.01)
*B60K 35/00* (2006.01)
*H04L 29/06* (2006.01)
*H04L 29/08* (2006.01)
*H04W 88/04* (2009.01)
*H04W 84/00* (2009.01)

(52) U.S. Cl.
CPC ............ *B60K 35/00* (2013.01); *H04L 65/605* (2013.01); *B60K 2350/355* (2013.01); *B60K 2350/357* (2013.01); *H04L 67/125* (2013.01); *H04W 84/005* (2013.01); *H04W 88/04* (2013.01)

(58) Field of Classification Search
CPC .............. B60K 35/00; B60K 2350/355; B60K 2350/357; H04L 67/125; H04L 65/605; H04W 88/04; H04W 84/005

USPC ........ 455/569.2, 550.1, 557, 344, 346, 3.06, 455/41.2, 66.1, 99, 100, 566

See application file for complete search history.

(56) References Cited

U.S. PATENT DOCUMENTS

| | | | |
|---|---|---|---|
| 6,937,732 B2 * | 8/2005 | Ohmura .................. | H04B 1/20 381/86 |
| 2006/0066506 A1 * | 3/2006 | Nojiri ...................... | H04N 5/66 345/3.1 |
| 2008/0250061 A1 * | 10/2008 | Kim ........................ | G11B 27/11 |
| 2012/0075095 A1 * | 3/2012 | Howard ............. | G08B 13/1427 340/539.12 |
| 2012/0077477 A1 * | 3/2012 | Oh ........................ | H04B 1/3822 455/414.2 |
| 2013/0045678 A1 * | 2/2013 | Lee ......................... | H04W 4/08 455/39 |
| 2013/0168175 A1 * | 7/2013 | Polzius ............... | A61B 10/0045 180/272 |
| 2013/0206495 A1 * | 8/2013 | Westbrook ........... | B60K 28/063 180/272 |
| 2014/0025847 A1 * | 1/2014 | Choi ....................... | H04L 67/06 710/33 |

(Continued)

*Primary Examiner* — Dominic Rego

(57) ABSTRACT

Disclosed is an interlocking system between content player devices. The interlocking system includes: a first mobile device; a second mobile device, in which an interlocking program is installed, interlocked with the first mobile device, and configured to receive and execute one or more contents executed by the first mobile device, and a vehicle head unit, in which an interlocking program is installed, interlocked with the second mobile device, and configured to receive and execute the contents executed by the second mobile device.

9 Claims, 4 Drawing Sheets

(56) References Cited

U.S. PATENT DOCUMENTS

| | | | |
|---|---|---|---|
| 2014/0106680 A1* | 4/2014 | McCormack | H04B 5/0031 455/63.1 |
| 2014/0157303 A1* | 6/2014 | Jo | H04N 21/4126 725/32 |
| 2015/0142225 A1* | 5/2015 | Tonguz | B61L 19/06 701/19 |
| 2015/0187145 A1* | 7/2015 | Park | G07C 5/008 701/31.5 |
| 2015/0244452 A1* | 8/2015 | Grohman | G01N 33/497 340/539.12 |
| 2016/0023665 A1* | 1/2016 | Sherony | B60W 50/12 701/2 |
| 2016/0173046 A1* | 6/2016 | Lee | H03G 3/20 381/104 |

* cited by examiner

INTERLOCKING SYSTEM BETWEEN CONTENT PLAYER DEVICES

CROSS-REFERENCE TO RELATED APPLICATIONS

This application claims priority to and the benefit of Korean Patent Application No. 10-2014-0167351 filed in the Korean Intellectual Property Office on Nov. 27, 2014, the entire contents of which are incorporated herein by reference.

TECHNICAL FIELD

The present invention relates to an interlocking system between content player devices.

BACKGROUND ART vehicle head unit has been developed to have characteristics, such as larger displays, complex AV functions, and improved navigation functions, and the like and to be commercialized, and a vehicle head unit product, in which a code division multiple access (CDMA) module is embedded to perform data communication in order to receive road information, road guidance data, and various information of interest in real time, has been developed in earnest.

In the vehicle head unit, a personal information management system (PIMS) function, such as a phone book, schedule management, and a vehicle account book, which has been used as a basic function of a personal digital assistant (PDA), is added, and accordingly, a character input means for a voice call, as well as data communication using the embedded CDMA module, is required, so that an input means, such as a touch screen and a jog dial, is also embedded.

Recently, interlocking technology between multimedia devices using various application programs has been developed, and the interlocking technology between multimedia devices is used by a method of displaying specific contents generated by a mobile device on a vehicle head unit, or displaying specific contents generated in a vehicle head unit on a mobile device.

However, according to the aforementioned methods, a mobile device and a vehicle head unit, which are located far from each other, cannot share specific contents formed of data, an image, a sound, a video, and the like through real-time broadcasting.

Accordingly, advanced technology for sharing specific contents formed of data, an image, a sound, a video, and the like between a mobile device and a vehicle head unit, which are located far from each other, by combining the interlocking technology between multimedia devices and high speed data transmission technology has been demanded.

SUMMARY OF THE INVENTION

The present invention has been made in an effort to provide an interlocking system between content player devices, which is capable of interlocking a mobile device and a vehicle head unit, which are located far from each other, or between vehicle head units by combining, the interlocking technology between multimedia devices and high speed data transmission technology.

An exemplary embodiment of the present invention provides an interlocking system between content player devices, including: a first mobile device; and a second mobile device, in which an interlocking program is installed, interlocked with the first mobile device, and configured to receive and play one or more contents played by the first mobile device.

The interlocking program of the second mobile device may control reception acceptance for the contents received from the first mobile device, and determine whether to display the reception accepted contents, and the second mobile device may include: a receiving unit configure to receive the contents from the first mobile device; a decoding with configured to decode the reception accepted contents; and a display with configured to display the contents, of which the display is determined by the interlocking program.

The system may further include a vehicle head unit, in which an interlocking program is installed, interlocked with the second mobile device, and configured to receive and play the contents executed by the second mobile device.

The interlocking program of the second mobile device may select and control the contents displayed on the display unit to be shared, and determine transmission acceptance of the contents selected to be shared, and the second mobile device may include: an encoding unit configured to encode the contents selected to be shared by the interlocking program of the second mobile device; and a connection management unit wirelessly or wifely connected with the vehicle head unit to transmit the contents, of which the transmission is accepted, to the vehicle head unit.

The interlocking program of the vehicle head unit may determine whether to accept the reception of the contents received from the second mobile device, and determine whether to display the reception accepted contents, and the vehicle head unit may include: a connection management unit wire or wirelessly connected with the second mobile device to receive the contents transmitted from the second mobile device; a decoding unit configured to decode the reception accepted contents; and a display unit configured to, when the display of the decoded contents is determined by the interlocking program of the vehicle head unit, display the display determined contents.

The interlocking program of the vehicle head unit may select and control the contents displayed on the display unit of the vehicle head unit to be Shared, and determine transmission acceptance of the contents selected to be shared, and the vehicle head unit may include: an encoding unit configured to encode the contents selected to be shared by the interlocking program of the vehicle head unit; and a connection management unit wirelessly or wiredly connected with the second mobile device to transmit the contents, of which the transmission is accepted by the interlocking program of the vehicle head unit, to the second mobile device.

The second mobile device may play the contents received from the vehicle head unit, and the first mobile device may include an interlocking program, an encoding unit, a transmitting unit, a receiving unit, a decoding unit, a display unit, and a connection management unit, which are the same as those of the second mobile device, and receive the contents of the vehicle head unit through the second mobile device and play the received contents.

The contents may include vehicle information contents, entertainment contents, navigation contents, and communication function contents.

The first mobile device, the second mobile device, and the vehicle head unit may play the same contents.

Another exemplary embodiment of the present invention provides an interlocking system between content player devices, including: a first vehicle head unit; a first mobile device, in which an interlocking program is installed, interlocked with the first vehicle head unit, and configured to receive and execute one or more contents executed by the first vehicle head unit; a second mobile device, in which an interlocking program is installed, interlocked with the first mobile device, and configured to receive and execute the contents executed by the first mobile device; and a second vehicle head unit, in which the interlocking program: is installed, interlocked with the second mobile device, and configured to receive and execute the contents executed by the second mobile device.

The first vehicle head unit, the first mobile device, the second mobile device, and the vehicle head unit may play the same contents.

According to the interlocking system between the content player devices, a mobile device and a vehicle head unit, or a vehicle head unit and another vehicle head unit which are located far from each other, may be interlocked, so that users, who are located far from each other, may use the same contents, so that the users may share positions, destinations, and the like of the users with each other in real time, thereby improving driving convenience.

Users, who are located far from each other, may share the same entertainment contents in real time, so that it is possible to achieve an effect in human sensibility ergonomics.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
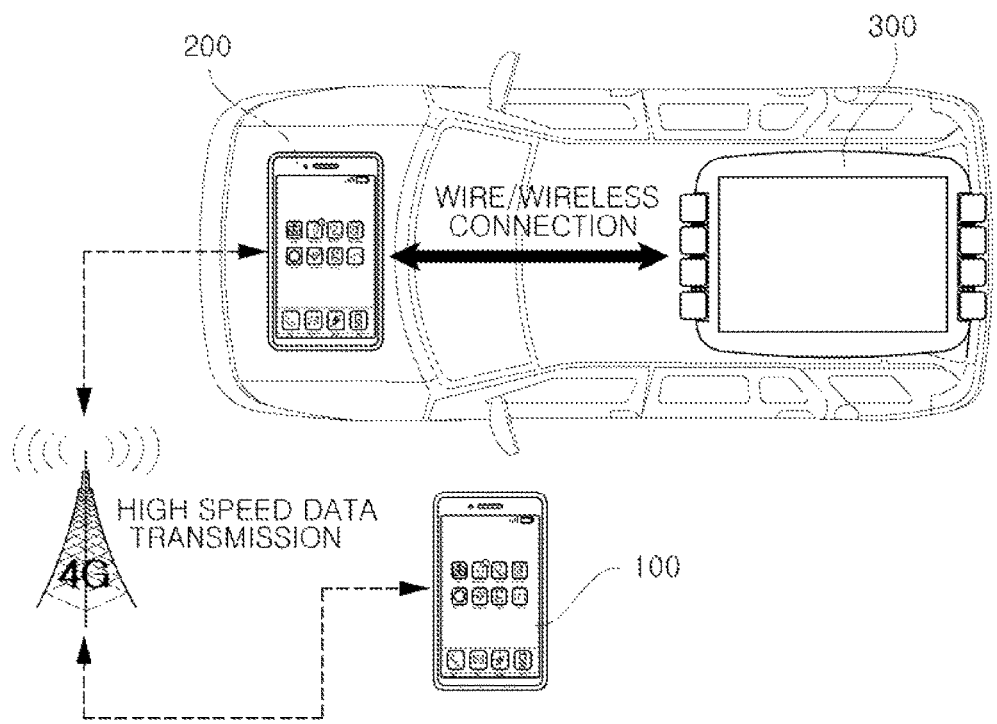
FIG. 1 is a conceptual diagram illustrating an interlocking system between content player devices according to a first exemplary embodiment of the present invention.

It should be understood that the appended drawings are not necessarily to scale, presenting, a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In order to sufficiently understand the present invention, the operational advantages of the present invention, and the objectives achieved by the embodiments of the present invention, the accompanying drawings illustrating exemplary embodiments of the present invention and the contents described therein need to be referred to.

Hereinafter, the present invention will be described in detail by describing an exemplary embodiment of the present invention with reference to the accompanying drawings. As those skilled in the art would realize, the described embodiments may be modified in various different ways, and is not limited to the described exemplary embodiment. Further, in order to clearly describe the invention, parts irrelevant to the description are omitted, and the same reference number refers to the same member in the drawing.

Throughout the specification and the claims, unless explicitly described to the contrary, the word "comprise" and variations such as "comprises" or "comprising" will be understood to imply the inclusion of stated elements but not the exclusion of any other elements. In addition the terms "-er", "-or", "module", and "block" described in the specification mean units for processing at least one function and operation and can be implemented by hardware components or software components and combinations thereof.

Referring to FIG. 1, an interlocking system between content player devices according to a first exemplary embodiment of the present invention is a system enabling a first mobile device 100, a second mobile device 200, and a vehicle head unit 300 to share contents.

The first mobile device 100 and the second mobile device 200 are multimedia devices capable of enabling a user to use various contents, such as entertainment contents, navigation contents, and communication function contents, while the user moves, and may be, for example, smart phones.

The vehicle head unit 300 is a multimedia device, which is mounted in a vehicle and enables a user to use various contents, such as entertainment contents, navigation contents, and communication contents, formed of a video an image, a sound, and the like while a user travels, and may be, for example, an audio video navigation (AVN) device.

An interlocking program may be installed in the first mobile device 100, the second mobile device 200, and the vehicle head unit 300, and the first mobile device 100, the second mobile device 200, and the vehicle head unit 300 may share the same contents with one another through the interlocking program.

Particularly, the first mobile device 100 and the second mobile device 200 have a high speed data transmission function, so that the contents may be interlocked between the first mobile device 100 and the second mobile device 200 even in a situation where the first mobile device 100 and the second mobile device 200 are located far from each other, and the vehicle head unit 300 may interlock the contents with the first mobile device 100, which is located far from the vehicle head unit 300, through the second mobile device 200 located at a close distance.

For example, when music contents are interlocked, a user using the second mobile device 200 and the vehicle head unit 300 may share the same music contents with a user of the first mobile device 100 located far away in real time, thereby achieving an effect in human sensibility ergonomics.

Figure 2:
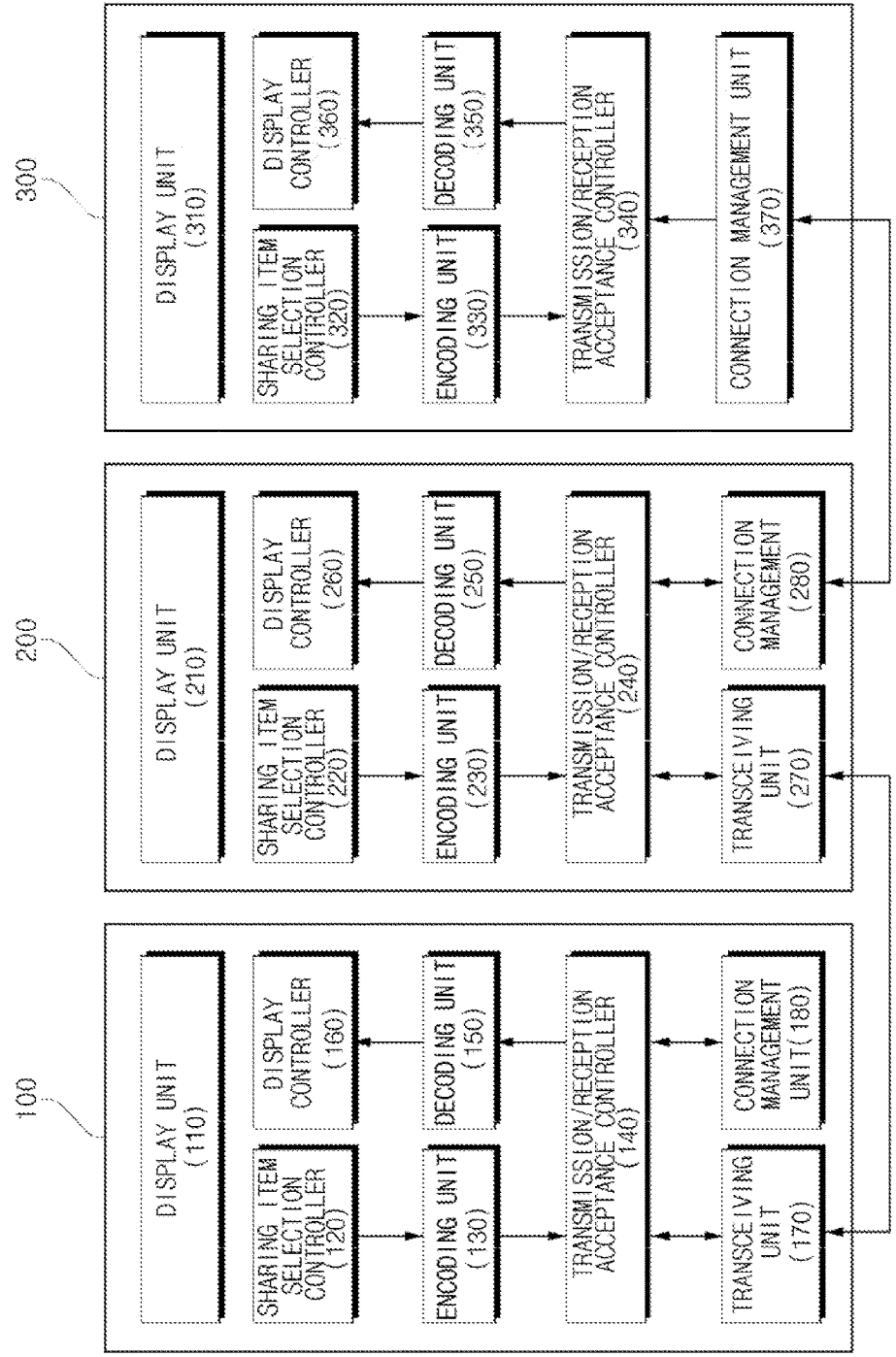
FIG. 2 is a block diagram illustrating the interlocking system between content player devices according to the first exemplary embodiment of the present invention.

An interlocking method between the first mobile device 100, the second mobile device 200, and the vehicle head unit 300 will be described with reference to FIG. 2. The first mobile device 100 may include a display unit 110, a sharing item selection controller 120, an encoding unit 130, a transmission/reception acceptance controller 140, a decoding unit 150, a display controller 160, a transceiving unit 170, and a connection management unit 180.

The second mobile device 200 may include a display unit 210, a sharing item selection controller 220, an encoding unit 230, a transmission/reception acceptance controller 240, a decoding unit 250, a display controller 260, a transceiving unit 270, and a connection management unit 280.

The vehicle head unit 300 may include a display unit 310, a sharing item selection controller 320, an encoding unit 330, a transmission/reception acceptance controller 340, a decoding unit 350, a display controller 360, and a connection management unit 370.

Here, the sharing item selection controller 120, the transmission/reception acceptance controller 140, and the display controller 160 have been described as devices, but functions thereof are actually performed by an inter locking program installed in the first mobile device 100, the second mobile device 200, and the vehicle head unit 300.

The first mobile device 100 and the second mobile device 200 are substantially formed of the same constituent elements, and even though positions of the first mobile device 100 and the second mobile device 200 are changed, the first mobile device 100 and the second mobile device 200 may be interlocked. Then, it is obvious that a content interlocking process of the first mobile device 100 may be replaced with a description of a content interlocking process of the second mobile device 200.

First, a content interlocking process by the second mobile device 200 will be described. When the second mobile device 200 and the first mobile device 100 are interlocked through an interlocking program, the transceiving unit 270 of the second mobile device 200 may receive currently played contents from the first mobile device 100.

The transmission/reception acceptance controller 240 of the second mobile device 200 may receive an acceptance command of a user through an input means, such as a touch screen, or determine whether to accept the reception of the contents according to a predetermined scheme.

When the transmission/reception acceptance controller 240 accepts to receive the contents, the decoding unit 250 of the second mobile device 200 may decode contents, which are encoded in a specific format, into contents formed of a voice, a video, an image, and the like so as to transmit the contents to a high speed data network.

The display controller 260 of the second mobile device 200 is a device for determining whether to display the contents decoded by the decoding unit 250, and when the display controller 260 receives a display command of a user through various input means, such as a touch input means and a voice input means, the display controller 260 may determine to display the contents.

The display unit 210 of the second mobile device 200 may display the contents, which is finally determined to be displayed, so that the user may view the contents. Here, the displayed contents are the same contents as the contents played in the first mobile device 100.

The second mobile device 200 may make the currently displayed contents be played in the vehicle head unit 300 by interlocking with the vehicle head unit 300 as necessary.

The sharing item selection controller 220 of the second mobile device 200 is a device for selectively controlling whether to share the currently displayed contents. The sharing item selection controller 220 may select the currently displayed contents and some contents among various contents, which are to be displayed later, to be shared. Accordingly, when the currently displayed contents are changed to other contents which are selected to be shared, the contents of the first mobile device 100 and the vehicle head unit 300 may be selectively changed to be identical to the contents changed by the second mobile device 200 according to the selection of the first mobile device 100 and the vehicle head unit 300.

The encoding unit 230 of the second mobile device 200 may encode the contents selected to be shared by the sharing item selection controller 220 in a specific format in accordance with the high speed data transmission or the interlocking between the multimedia devices.

The transmission/reception acceptance controller 240 of the second mobile device 200 may determine whether to transmit the encoded contents according to a predetermined scheme or by receiving a user command through various input means.

The connection management unit 280 of the second mobile device 200 is a device for determining a connection or a disconnection between the second mobile device 200 and the vehicle head unit 300. When the second mobile device 200 and the vehicle head unit 300 are wiredly or wirelessly connected, the connection management unit 280 may transmit the contents, of which the transmission is accepted by the transmission/reception acceptance controller 240, to the vehicle head unit 300.

When the vehicle head unit 300 and the second mobile device 200 are wiredly or wirelessly connected, the connection management unit 370 of the vehicle head unit 300 may receive the contents from the second mobile device 200.

The transmission/reception acceptance controller 340 of the vehicle head unit 300 may determine whether to receive the contents received from the second mobile device 200 according to a predetermined scheme or by receiving a user command through various input means.

The decoding unit 350 of the vehicle head unit 300 may decode the contents, of which the reception is accepted by the transmission/reception acceptance controller 340, into a voice, a video, an image, and the like, so that the user may view the contents.

The display controller 360 of the vehicle head unit 300 may determine whether to display the decoded contents by receiving a user command through the various input means.

The display unit 310 of the vehicle head unit 300 may display the contents, which is finally determined to be displayed, so that the user may view the contents.

Here, the contents displayed in the vehicle head unit 300 may be simultaneously displayed in the first mobile device 100 and the second mobile device 200, and accordingly, the users located far from each other may share the same contents in real time.

As described above, it is obvious that the contents may be shared from the first mobile device 100 to the vehicle head unit 300 through the second mobile device 200, and the contents may be shared from the vehicle head unit 300 to the first mobile device 100 through the second mobile device 200.

Figure 3:
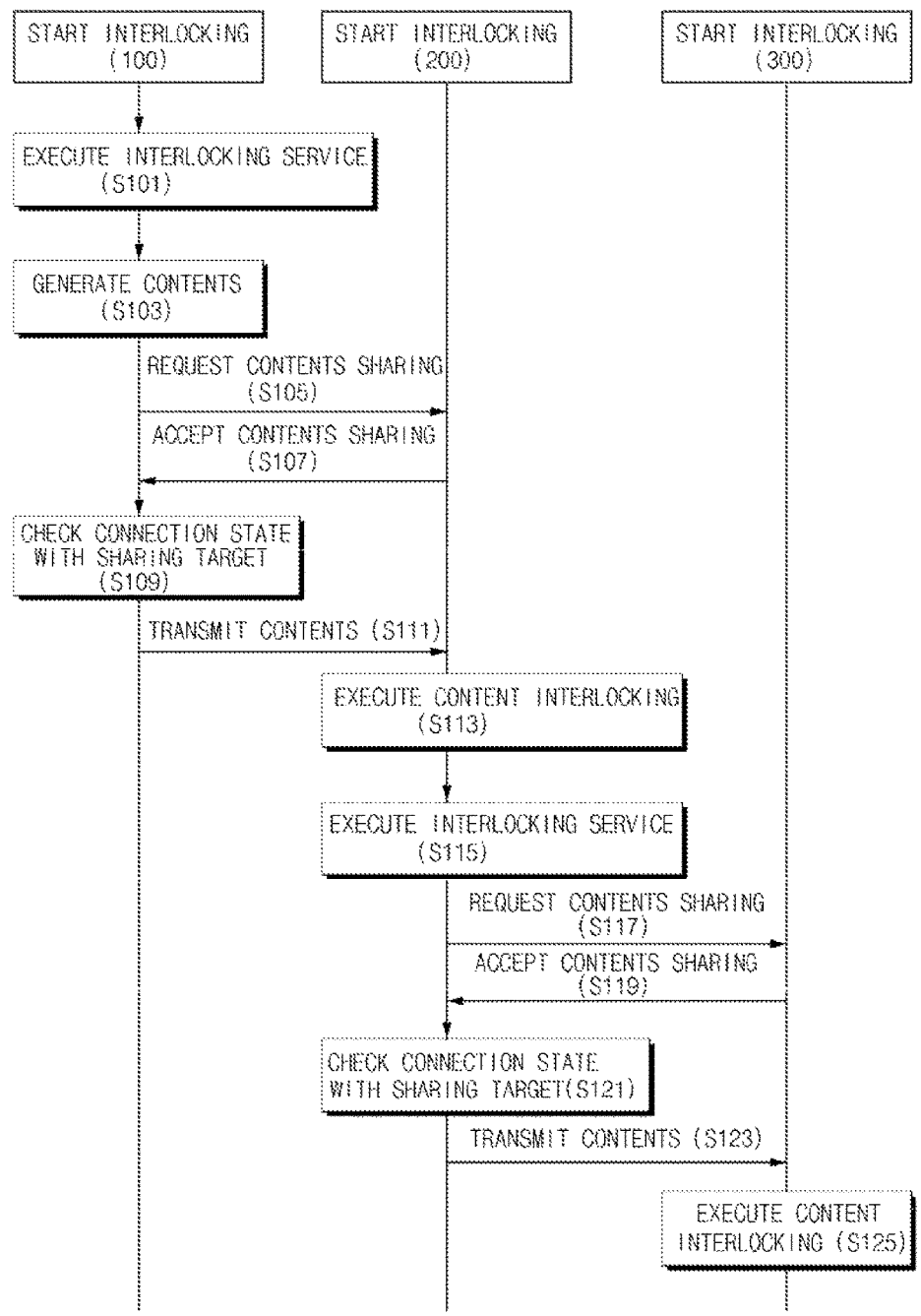
FIG. 3 is a flowchart illustrating an interlocking method between a vehicle head unit and a mobile device according to a first exemplary embodiment of the present invention.

Referring to FIG. 3, in an interlocking method between the vehicle head unit and the mobile device according to the first exemplary embodiment of the present invention, first, when interlocking of the first mobile device 100, the second mobile device 200, and the vehicle head unit 300 begins through an interlocking program installed in each of the first mobile device 100, the second mobile device 200, and the vehicle head unit 300, the first mobile device 100 executes an interlocking service (S101).

Next, the first mobile device 100 generates contents to be interlocked (S103). Here, the contents may include entertainment contents, such as music, movies, videos, images, and games, navigation contents indicating a movement route, a destination, and the like of a vehicle, and communication contents, such as a text message and a voice message.

Next, the first mobile device 100 selects the contents to be interlocked, and requests sharing acceptance for the selected contents from the second mobile device 200 (S105).

Next, the second mobile device 200 responds to the request for the sharing acceptance of the first mobile device 100 and accepts the sharing (S107). Here, when the second mobile device 200 rejects the sharing, the sharing of the contents between the first mobile device 100 and the second mobile device 200 is interrupted.

Next, the first mobile device 100 cheeks a connection state with the second mobile device 200 (S109). Here, when the connection state between the first mobile device 100 and the second mobile device 200 is not even, the request for the contents sharing in operation S105 may be re-attempted.

Next, when the first mobile device 100 is normally connected with the second mobile device 200, the first mobile device 100 transmits the contents selected in operation S105 to the second mobile device 200 (S111).

Next, the second mobile device 200 performs interlocking the contents by playing the contents received from the first mobile device 100 on a screen (S113).

Next, the second mobile device 200 executes an interlocking service for the interlocking with the vehicle head unit 300 interlocked through the interlocking program (S115).

Next, the second mobile device 200 selects the currently played contents as the contents to be interlocked, and requests for sharing acceptance for the selected contents from the vehicle head unit 300 (S117).

Next, the vehicle head unit 300 accepts the sharing in response to the request for the sharing acceptance of the second mobile device 200 (S119). Here, when the vehicle head unit 300 rejects the sharing, the sharing of the contents between the second mobile device 200 and the vehicle head unit 300 is interrupted.

Next, when the vehicle head unit 300 accepts the sharing, the second mobile device 200 checks a connection state with the vehicle head unit 300 (S121). Here, when the connection state between the second mobile device 200 and the vehicle head unit 300 is not even, the request for the contents sharing of operation S117 may be re-attempted.

Next, when the second mobile device 200 and the vehicle head unit 300 are normally connected, the second mobile device 200 transmits the currently played contents to the vehicle head unit 300 (S123).

Lastly the vehicle head unit 300 performs the interlocking of the contents by playing the contents received from the second mobile device 200 (S125).

Accordingly, the first mobile device 100, the second mobile device 200, and the vehicle head unit 300 may play the same contents, and when the first mobile device 100, the second mobile device 200, and the vehicle head unit 300 Share navigation contents, the users may confirm a position and a destination in real time, thereby improving driving convenience, and when the first mobile device 100, the second mobile device 200, and the vehicle head unit 300 share entertainment contents, such as music or a movie, users may share their interest in real time, thereby achieving an effect in human sensibility ergonomics.

Figure 4:
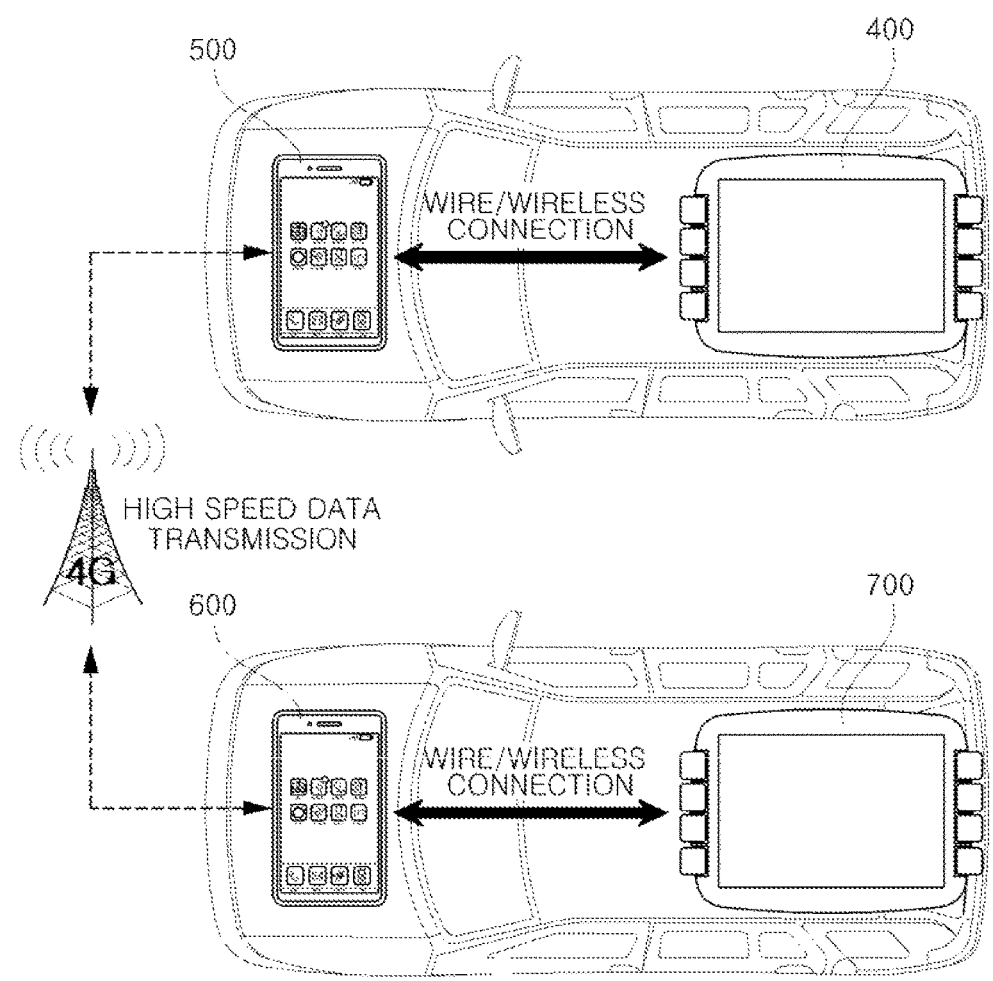
FIG. 4 is a conceptual diagram illustrating an interlocking system between content player devices according to a second exemplary embodiment of the present invention.

Referring to FIG. 4, an interlocking system between content player devices according to a second exemplary embodiment of the present invention may include a first vehicle head unit 400, a first mobile device 500, a second mobile device 600, and a second vehicle head unit 700.

The interlocking system between content player devices according to a second exemplary embodiment of the present invention may further include another vehicle head unit, compared to the interlocking system between content player devices according to the first exemplary embodiment. Here, the interlocking system between content player devices according to the exemplary embodiment of the present invention is not limited to the first and second exemplary embodiments, and may include additional vehicle head units and additional mobile devices to interlock and play various contents.

Here, the interlocking system between content player devices according to the second exemplary embodiment will be briefly described. The first vehicle head unit 400 may play navigation contents; entertainment contents, and communication contents, and display vehicle information contents obtained by various sensors of the vehicle.

The first vehicle head unit 400 may transmit vehicle information about the vehicle, in which the first vehicle head unit 400 is mounted, to the second vehicle head unit 700 through the first mobile device 500 and the second mobile device 600 which are interlocked through an interlocking program, and accordingly, the first vehicle head unit 400 and the second vehicle head unit 700 may share vehicle information contents, such as GPS information, a vehicle speed, and fuel efficiency information, in real time.

The first vehicle head unit 400 and the second vehicle head unit 700 of the second exemplary embodiment may include the constituent elements of the vehicle head unit 300 of the first exemplary embodiment, and the first mobile device 500 and the second mobile device 600 of the second exemplary embodiment may include the constituent elements of the first mobile device 100 and the second mobile device 200 of the first exemplary embodiment, so that the vehicle information contents may be shared in real time as described above.

Meanwhile, the embodiments according to the present invention may be implemented in the form of program instructions that can be executed by computers, and may be recorded in computer readable media. The computer readable media may include program instructions, a data, file, a data structure, or a combination thereof. By way of example, and not limitation, computer readable media, may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology. CD-ROM, digital versatile (DVD) or other optical disk storage, magnetic cassettes, medium which Can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An interlocking system between content player devices, the system comprising:
    a first mobile device;
    a second mobile device in which an interlocking program is installed, the second mobile device being interlocked with the first mobile device, and configured to receive and play one or more contents played by the first mobile device, the interlocking program of the second mobile device controlling reception acceptance for the contents received from the first mobile device and determining whether to display the reception-accepted contents, the second mobile device including:
        a receiving unit configured to receive the contents from the first mobile device;
        a decoding unit configured to decode the reception-accepted contents; and
        a display unit configured to display the determined contents by the interlocking program of the second mobile device; and
    a vehicle head unit in which an interlocking program is installed, the vehicle head unit being interlocked with the second mobile device and configured to receive and play the contents executed by the second mobile device, the interlocking program of the vehicle head unit selecting and controlling contents displayed on a display unit of the vehicle head unit to be shared, and determining transmission acceptance of the contents selected to be shared, the vehicle head unit including:
        an encoding unit configured to encode the contents selected to be shared by the interlocking program of the vehicle head unit; and
        a connection management unit wirelessly or wiredly connected with the second mobile device to transmit the transmission-accepted contents to the second mobile device.

2. The interlocking system of claim 1, wherein the interlocking program of the second mobile device selects and controls the contents displayed on the display unit of the second mobile device to be shared, and determines transmission acceptance of the contents selected to be shared, and
    wherein the second mobile device further includes:
        an encoding unit configured to encode the contents selected to be shared by the interlocking program of the second mobile device; and
        a connection management unit wirelessly or wiredly connected with the vehicle head unit to transmit the transmission-accepted contents to the vehicle head unit.

3. The interlocking system of claim 2, wherein the interlocking program of the vehicle head unit determines reception acceptance of the contents received from the second mobile device, and determines whether to display the reception-accepted contents,
    wherein the connection management unit of the vehicle head unit receives the contents transmitted from the second mobile device, and
    wherein the vehicle head unit further includes:
        a decoding unit configured to decode the reception-accepted contents; and
        a display unit configured to, when the interlocking program of the vehicle head unit determines to display the decoded contents, display the determined contents.

4. The interlocking system of claim 1, wherein the second mobile device plays the contents received from the vehicle head unit, and
    the first mobile device includes an interlocking program, an encoding unit, a transmitting unit, a receiving unit, a decoding unit, a display unit, and a connection management unit, which are the same as those of the second mobile device, and receives the contents of the vehicle head unit through the second mobile device and plays the received contents.

5. The interlocking system of claim 1, wherein the contents include vehicle information contents, entertainment contents, navigation contents, and communication function contents.

6. The interlocking system of claim 1, wherein the first mobile device, the second mobile device, and the vehicle head unit play the same contents.

7. An interlocking system between content player devices, comprising:
    a first vehicle head unit;
    a first mobile device in which an interlocking program is installed, the first mobile device being interlocked with the first vehicle head unit, and configured to receive and execute one or more contents executed by the first vehicle head unit;
    a second mobile device in which an interlocking program is installed, the second mobile device being interlocked with the first mobile device, and configured to receive and execute the contents executed by the first mobile device; and
    a second vehicle head unit in which an interlocking program is installed, the second vehicle head unit being interlocked with the second mobile device, and configured to receive and execute the contents executed by the second mobile device, the interlocking program of the second vehicle head unit selecting and controlling contents displayed on a display unit of the second vehicle head unit to be shared, and determining transmission acceptance of the contents selected to be shared, the second vehicle head unit including:
        an encoding unit configured to encode the contents selected to be shared by the interlocking program of the second vehicle head unit; and
        a connection management unit wirelessly or wiredly connected with the second mobile device to transmit the transmission-accepted contents to the second mobile device.

8. The interlocking system of claim 7, wherein the first vehicle head unit, the first mobile device, the second mobile device, and the second vehicle head unit play the same contents.

9. An interlocking system comprising:
- a first mobile device;
- a second mobile device in which an interlocking program is installed, the second mobile device being interlocked with the first mobile device, and configured to receive and play one or more contents played by the first mobile device, the interlocking program of the second mobile device controlling reception acceptance for the contents received from the first mobile device and determining whether to display the reception-accepted contents, the second mobile device including:
  - a receiving unit configured to receive the contents from the first mobile device;
  - a decoding unit configured to decode the reception-accepted contents;
  - a display unit configured to display the determined contents by the interlocking program of the second mobile device, the interlocking program of the second mobile device selecting and controlling the contents displayed on the display unit to be shared, and determining transmission acceptance of the contents selected to be shared;
  - an encoding unit configured to encode the contents selected to be shared by the interlocking program of the second mobile device; and
  - a connection management unit wirelessly or wiredly connected with the vehicle head unit to transmit the transmission-accepted contents to the vehicle head unit; and
- a vehicle head unit in which an interlocking program is installed, the vehicle head unit being interlocked with the second mobile device and configured to receive and play the contents executed by the second mobile device, the interlocking program of the vehicle head unit determining reception acceptance of the contents received from the second mobile device, and determining whether to display the reception-accepted contents, the vehicle head unit including:
  - a connection management unit wiredly or wirelessly connected with the second mobile device to receive the contents transmitted from the second mobile device;
  - a decoding unit configured to decode the reception-accepted contents; and
  - a display unit configured to, when the interlocking program of the vehicle head unit determines to display the decoded contents, display the determined contents.

* * * * *